(12) United States Patent
Spanner

(10) Patent No.: US 6,369,951 B1
(45) Date of Patent: Apr. 9, 2002

(54) BEAM SPLITTER ASSEMBLY AND INTERFEROMETER HAVING A BEAM SPLITTER ASSEMBLY

(75) Inventor: Erwin Spanner, Forstmeierstrasse (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/511,757

(22) Filed: Feb. 24, 2000

(30) Foreign Application Priority Data

Feb. 26, 1999 (DE) .......................................... 199 08 297
Dec. 4, 1999 (DE) .......................................... 199 58 555

(51) Int. Cl.[7] .......................... G02B 27/14; G02B 27/10
(52) U.S. Cl. ....................................... 359/629; 359/618
(58) Field of Search ................................. 359/618, 629; 356/451, 493, 498, 508

(56) References Cited

U.S. PATENT DOCUMENTS

| 4,170,401 A |   | 10/1979 | Yoder, Jr. et al. | 359/487 |
|---|---|---|---|---|
| 4,671,613 A |   | 6/1987 | Buhrer | 359/495 |
| 4,802,765 A |   | 2/1989 | Young et al. | 356/487 |
| 5,056,921 A | * | 10/1991 | Chaney | 356/351 |
| 5,305,088 A | * | 4/1994 | Hosoe | 356/351 |
| 5,374,991 A | * | 12/1994 | Atkinson | 356/358 |
| 5,675,412 A |   | 10/1997 | Solomon | 356/450 |
| 5,751,482 A | * | 5/1998 | Challener, IV | 359/487 |
| 5,757,491 A | * | 5/1998 | Cai | 356/358 |
| 5,808,739 A |   | 9/1998 | Turner et al. | 356/519 |
| 5,847,828 A | * | 12/1998 | Downs | 356/346 |

FOREIGN PATENT DOCUMENTS

| DE | 34 00 389 | 7/1985 |
|---|---|---|
| DE | 36 45 001 | 1/1987 |
| DE | 198 15 241 | 10/1999 |
| EP | 0 227 554 | 7/1987 |
| EP | 0 244 275 | 11/1987 |
| EP | 0 469 718 | 2/1992 |
| EP | 0 623 801 | 11/1994 |
| WO | WO 96/31752 | 10/1996 |
| WO | WO96/36848 | 11/1996 |

OTHER PUBLICATIONS

Bauelemente der Optik [Design Elements In Optics], Naumann/Schröder, Carl Hanser Verlag, 6th Edition, p. 184. *

* cited by examiner

*Primary Examiner*—Ricky Mack
*Assistant Examiner*—Gary O'Neill
(74) *Attorney, Agent, or Firm*—Kenyon & Kenyon

(57) ABSTRACT

A beam splitter assembly and an interferometer using the beam splitter assembly are described. The beam splitter assembly splits an incoming beam of rays that impinges thereon into at least one first outgoing beam and at least one second outgoing beam parallel thereto. To accomplish this, the beam splitter assembly includes a beam splitter element and a compensating element. The beam splitter element includes a transparent plate having two parallel boundary surfaces. The compensating element is arranged with respect to the beam splitter element so that the two outgoing beams propagate parallel to one another, and have essentially traveled the same optical path lengths in the beam splitter element as in the compensating element.

31 Claims, 7 Drawing Sheets

BEAM SPLITTER ASSEMBLY AND INTERFEROMETER HAVING A BEAM SPLITTER ASSEMBLY

The present invention relates to a beam splitter assembly and to an interferometer using the beam splitter assembly.

DESCRIPTION OF RELATED ART

Interferometers generally include one or a plurality of beam splitter assemblies used to physically split a beam of rays into a measuring path and a reference path, often referred to as the measuring arm and the reference arm. This assembly is generally used to combine the measuring path and the reference path in the opposite direction of the beam. The optical axes of the measuring arm and reference arm are oriented differently relative to one another, depending on the type of interferometer. Thus, the measuring arm and the reference arm may be essentially perpendicular to one another or parallel to one another.

In the former case, beam-splitting prisms onto which a triple prism that creates the reference arm is cemented are generally used. This is shown, for example, in U.S. Pat. No. 4,802,765.

In the latter case, where the measuring path and the reference path are parallel to one another, a Kösters prism is usually used as a suitable beam splitter. A prism of this kind used as a classic beam splitter element is described in the textbook *Bauelemente der Optik* [Design Elements in Optics], Naumann/Schröder, Carl Hanser Verlag, 6$^{th}$ Edition, page 184. The principal disadvantage of a beam splitter of this kind is that it is relatively expensive to manufacture.

Any manufacturing-related pyramidal flaws in the Kösters prism cause the path to diverge from the ideal path to a greater or lesser degree. The parallelism of the two outgoing beams is sensitive to whether the angle of incidence of the incoming beam relative to the beam splitter assembly is optimally correct. Even a slight angle relative to the optimal axis of incidence causes the two outgoing beams to converge or diverge significantly. Similarly, if the incoming beam undergoes a parallel shift relative to the optimal axis of incidence, this has a significant effect on the distance between the two outgoing beams. In particular, problems occur if the path length between the beam splitter assembly and the downstream measuring reflector and reference reflector in the measuring arm and reference arm is large. Changes in the path length along the direction of propagation of the beam exiting the beam splitter assembly are disadvantageous, as optical components arranged downstream in the beam path must be oriented precisely to these beams. As a result, adjustments involving considerable expenditure must be made to ensure that the incidence of the incoming beam is optimally correct.

U.S. Pat. No. 5,675,412 describes a beam splitter assembly that avoids these problems. The two components, one of which has a beam-splitting and the other a beam-deflecting optical effect in the assembly, are arranged separately from one another, and must therefore be mounted with great precision relative to one another, so that the two outgoing beams propagate parallel to one another.

U.S. Pat. No. 5,808,739 describes another type of beam splitter assembly for an interferometer that delivers two beams that are parallel to one another. Herein, an incident beam impinges on a first arrangement that includes two planar plates arranged parallel to one another and fixed in position using spacers, so that they face one another. On the rear side of the first planar plate, a beam splitter layer is arranged which splits the input beam into a transmitted beam component ART and a reflected beam component ARR. Reflected beam component ARR exits the first plate after passing through it again and propagates to a second arrangement that includes two spaced planar plates. After being reflected a plurality of times in the second arrangement, reflected beam component ARR exits the beam splitter arrangement in the direction of the reflector. Beam component ART, which has been transmitted through the beam splitter layer of the first arrangement, is reflected off a second reflective layer of the second planar plate and deflected back in the direction of the first planar plate. After passing through the first planar plate again, beam component ART exits the first planar plate arrangement parallel to beam component ARR.

In order to achieve the advantages associated with this type of beam splitter as proposed, the two planar plates must be oriented parallel to one another within the first arrangement with great precision. To accomplish this, adjustments involving considerable expenditure are required during assembly, and the spacers arranged between the planar plates are also expensive to manufacture.

SUMMARY OF THE INVENTION

The present invention is thus a beam splitter assembly, in particular for an interferometer, that splits an incoming beam into at least two outgoing parallel beams. The device is as insensitive as possible to non-optimally oriented incoming beams, and is inexpensive to manufacture compared to current devices. The invention is also an interferometer that uses the beam splitter assembly and prevents the aforementioned problems of the current devices from occurring.

In one embodiment, the invention is a beam splitter assembly for an interferometer adapted to split an incoming beam into at least one first outgoing beam and at least one second outgoing beam parallel to the at least one first beam. The beam splitter includes at least one beam splitter element, each of the at least one beam splitter elements further comprising a transparent plate having two parallel boundary surfaces, a first of the two boundary surfaces having a portion functioning as an at least partially reflective reflector surface, and a second of the two boundary surfaces having a portion functioning as a beam splitter surface. The beam splitter also includes at least one compensating element disposed relative to the at least one beam splitter element so that the at least one first and second outgoing beams propagate parallel to one another, the at least one compensating element having dimensions adapted to provide a substantially identical optical path length in the at least one beam splitter element as in the at least one compensating element to the at least one first and second outgoing beams.

In another embodiment, the invention is an interferometer having at least one measuring arm and a reference arm, comprising a light source, at least one stationary reference reflector in the reference arm, at least one measuring reflector movable in a measuring direction in the measuring arm, a detector unit for detecting a position-dependent interference signal, an evaluation unit for processing the interference signal detected by the detector unit, and at least one beam splitter assembly for splitting an incoming beam emitted by the light source into at least one first outgoing beam and at least one second outgoing beam parallel thereto, said at least one beam splitter assembly further comprising. The beam splitter assembly also includes at least one beam splitter element comprising a transparent plate having two parallel boundary surfaces, one of these boundary surfaces having a portion functioning as a beam splitter surface, and a further boundary surface parallel to the aforementioned boundary surface having a portion functioning as an at least partially reflective reflector surface, and at least one compensating element arranged with respect to the at least one beam splitter element so that at least two outgoing beams propagate parallel to one another, and so that the at least two outgoing beams travel along optical paths having substantially the same length in the interferometer before reaching the detector unit.

The beam splitter assembly according to the present invention includes two separate elements, namely the beam splitter element and a compensating element. Both elements of the beam splitter assembly can be plane-parallel plates, so that no extra manufacturing expenditure or adjustment is required to ensure that the parallelism requirements associated with the respective boundary surfaces are met.

Furthermore, the beam splitter assembly according to the present invention ensures that if the incoming beam is not optimally oriented, the at least two outgoing beams propagate substantially parallel to one another and the distance between the two outgoing beams is kept substantially constant.

The proposed beam splitter assembly and the associated adjustment tolerance allows a certain amount of flexibility when designing an interferometer according to the present invention. In particular, the interferometer measuring head may be modular in design and non-critical in terms of adjustment, and may include an optics module and an electronics module. The optics module can contain, among other things, the beam splitter assembly according to the present invention. The electronics module can contain, among other things, the detector elements for detecting the interference signals.

The interferometer according to the present invention may be designed differently for different applications, for example for combined detection of linear and rotational movements.

BRIEF DESCRIPTION OF THE DRAWINGS

Further advantages and details of the beam splitter assembly according to the present invention and of the interferometer according to the present invention are explained in the description of a plurality of exemplary embodiments below, with the help of the attached drawings.

In the Drawings.

DETAILED DESCRIPTION OF THE EMBODIMENTS OF THE INVENTION

Figure 1:
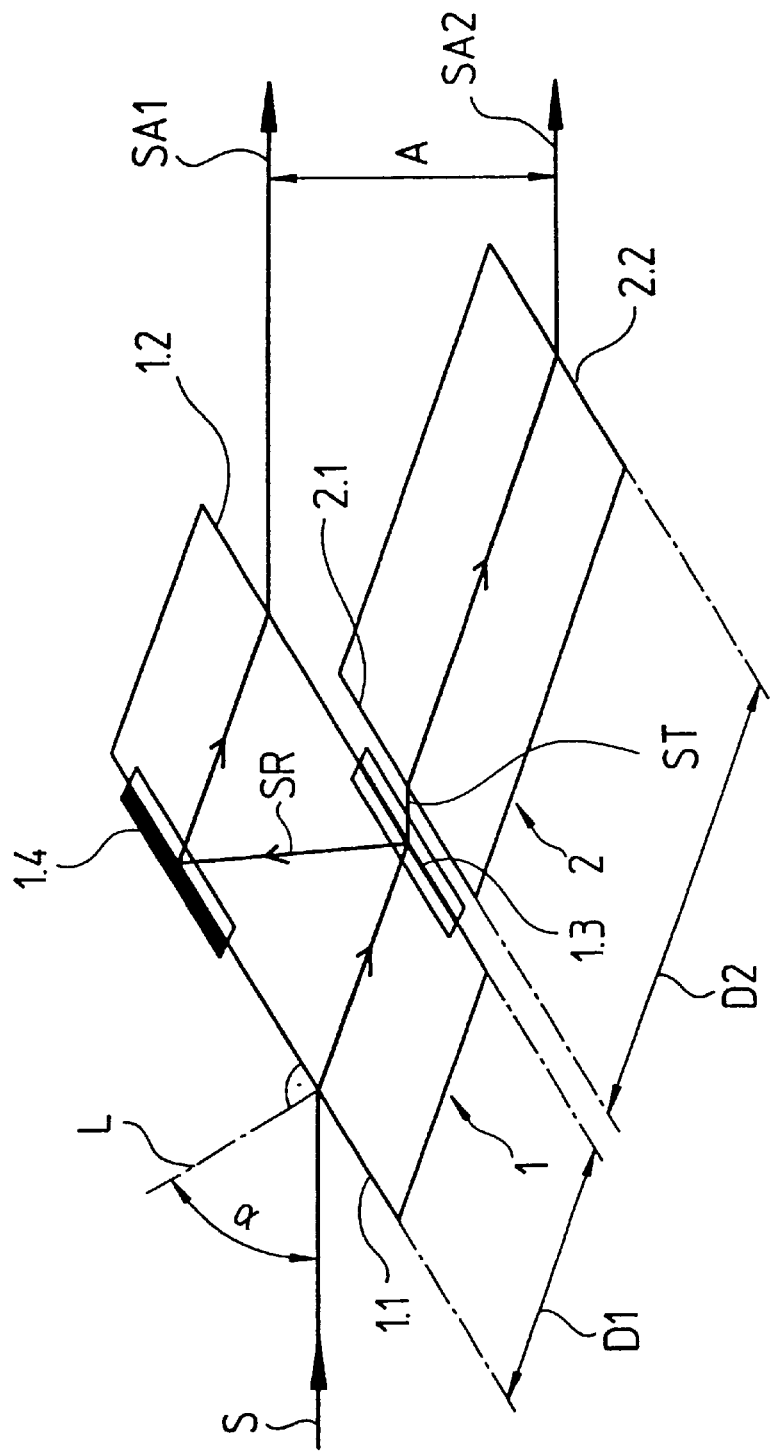
FIG. 1 is a diagram showing the beam path of a first embodiment of the beam splitter assembly according to the present invention.

The design of the beam splitter assembly according to the present invention is described in view of FIG. 1, which shows a first exemplary embodiment of the invention.

The beam splitter assembly according to the present invention includes two components, beam splitter element 1 and compensating element 2. To ensure clarity, the other interferometer elements such as the light source, the reflector elements, the detector elements, and the evaluation unit are not shown in FIG. 1.

The beam delivered by the light source, e.g., an HeNe laser, initially travels to beam splitter element 1 as incoming beam S. This element 1 is designed as a transparent plate having at least two exactly parallel boundary surfaces 1.1, 1.2. Standard optical glass such as BK7 is a suitable material for the plate. Alternatively quartz glass or if necessary Zerodur may be used. In this exemplary embodiment, at entry boundary surface 1.1 incoming beam S is only refracted in the direction of perpendicular L of entry surface 1.1 (indicated in the drawing). Incoming beam S enters beam splitter element 1 at angle a relative to perpendicular L. In one possible embodiment, angle $\alpha$ can be a Brewster angle $\alpha \approx 57°$, if glass is used as the plate material.

After passing through the plate, incoming beam S impinges on second boundary surface 1.2, a portion of which acts as a beam splitter surface 1.3 for incoming beam S. Incoming beam S is split into two partial beams SR, ST at beam splitter surface 1.3. Partial beam SR is reflected off beam splitter surface 1.3 and deflected back in the direction of first boundary surface 1.1; while second partial beam SR passes through beam splitter surface 1.3 in the direction of compensating element 2.

On the partial impingement area of the first boundary surface 1.1, reflector surface 1.4 is arranged so that partial beam SR is reflected in the direction of second boundary surface 1.2. The beam SR passes through a transparent partial area of surface 1.2, so that refraction only occurs on the boundary surface in question at the transition from the glass to the air. Thus, after exiting beam splitter element 1, first outgoing beam SA1 is available and can be used as a measuring beam or reference beam as the interferometer beam continues to propagate.

Partial beam ST which is transmitted through beam splitter surface 1.3 propagates to first boundary surface 2.1 of compensating element 2, is refracted at boundary surface 2.1 and passes through compensating element 2 without further deflection until it reaches second boundary surface 2.2, through which it exits compensating element 2 as second outgoing beam SA2. Second outgoing beam SA2 can then also be used as a measuring beam or reference beam as the interferometer beam continues to propagate.

In the embodiment shown, compensating element 2 is also designed as a plane-parallel plate having two boundary surfaces parallel to one another. These are an entry boundary surface and exit boundary surface 2.1, 2.2, oriented parallel to one another using high-precision methods. The aforementioned materials used for beam splitter element 1 are also suitable materials for compensating element 2.

The optical function of compensating element 2 is to ensure that ultimately the two outgoing beams SA1, SA2 essentially travel the same optical path length in elements 1, 2. In the exemplary embodiment shown, this is accomplished by ensuring that thickness $D_2$ of compensating element 2 is twice as great as thickness $D_1$ of beam splitter element 1.

In the exemplary embodiment shown, the aforementioned requirement can easily be met by ensuring that thickness $D_2$ of compensating element 2 is twice as great as thickness $D_1$ of beam splitter element 1, because both elements are made of the same material. In general, it is therefore important to ensure that outgoing beams SA1, SA2 have essentially traveled the same optical path length in elements 1, 2 of the beam splitter assembly. The optical path length is defined to mean the product of the geometric path length and the index of refraction. By designing compensating element 2 in this manner, it can be ensured that in the event of temperature fluctuations both outgoing beams SA1, SA2 are subject to the same influences in the beam splitter assembly according to the present invention, and are therefore influenced in an identical manner.

A further useful effect relating to the functioning of compensating element 2 is that distance A between outgoing beams SA1 and SA2 can be increased. This means the beam paths of the two outgoing beams SA1, SA2 can be tailored to the particular design features of the interferometer.

It is useful to ensure that there is a small gap between compensating element 2 and beam splitter element 1, such as a narrow air space. The alternative to this is to cement element 2 onto beam splitter element 1, but this could result in a beam shift due to a cementing-related flaw, for example, if the layer of cement is wedge-shaped. Furthermore, cementing adds an additional step to the manufacturing process for the assembly.

In the exemplary embodiment shown in FIG. 1, beam splitter surface 1.3 affects the optical polarization, so that the directions of polarization of the two outgoing beams SA1 and SA2 are perpendicular to one another. Reflector surface 1.4 of beam splitter element 1 can be, for example, a highly reflective dielectric layer packet.

If the beam splitter surface is such that transmitted partial beam ST is p-polarized, a further useful effect can be achieved, providing the angle of incidence $\alpha \approx 57°$. In such instances there is no need for a reflection-reducing layer or coating on boundary surfaces 2.1, 2.2 of compensating element 2, which means manufacturing costs can be reduced.

It is important to note that the embodiment of beam splitter surface 1.3 and reflector surface 1.4 described above is not essential to the invention. Indeed, other alternatives can be implemented as part of the present invention. Thus beam splitter surface 1.3 may be a neutral splitter that may be dielectric or metallic. Moreover, reflector surface 1.4 may be a metallic reflector surface, such as an Al or Ag layer.

In both cases, the beam-splitting and beam-reflecting effects, respectively, of the surfaces in question are the relevant elements of the present invention.

Figure 2A:
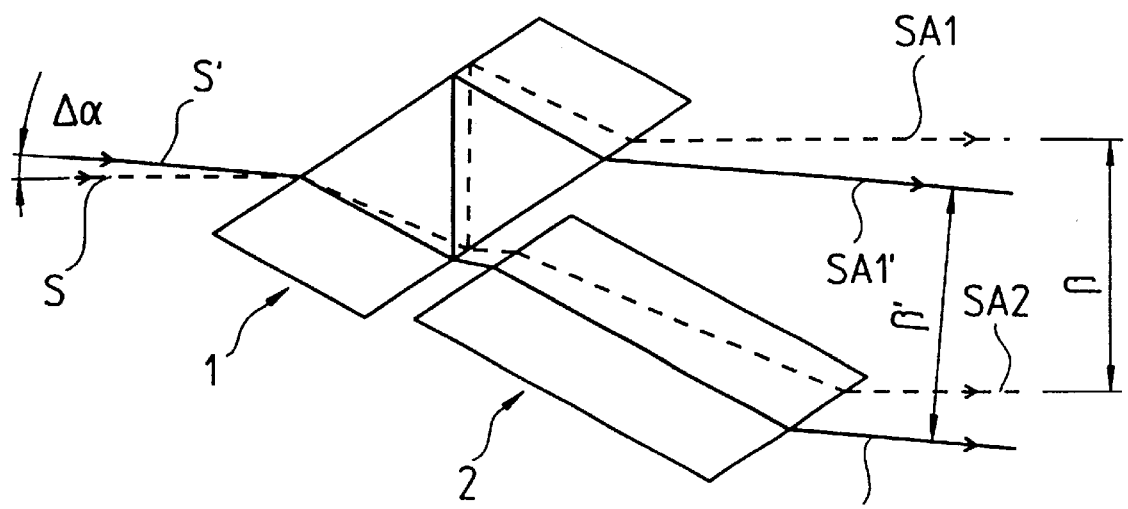
FIGS. 2a and 2b are diagrams showing the beam paths in the case that the incoming beam diverges from the optimal direction of incidence.
Figure 2B:
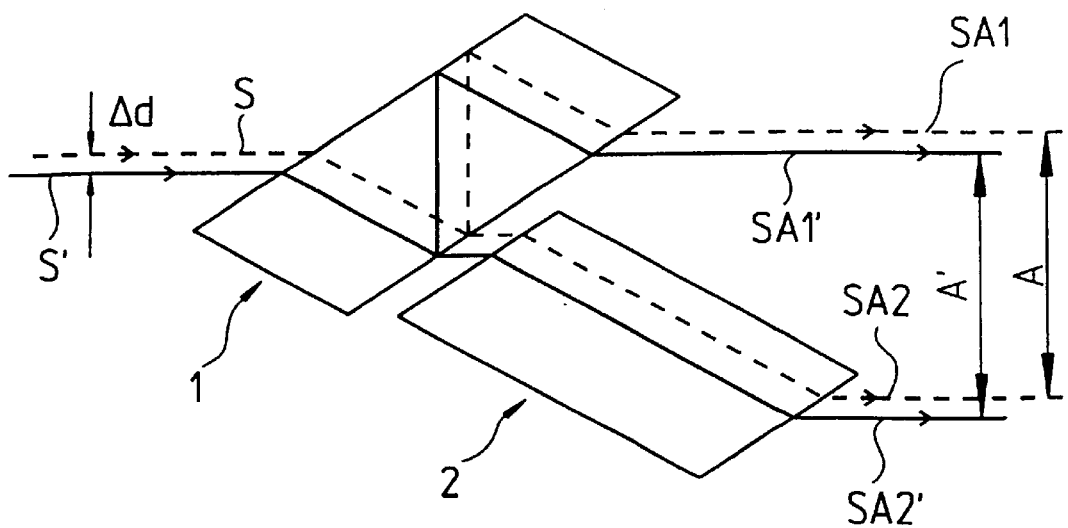

A significant advantage of the beam splitter assembly according to the present invention is described with the help of FIGS. 2a and 2b. In the exemplary embodiment of the beam splitter assembly described in FIG. 1, in addition to an optimally incident incoming beam S a further incoming beam S' is shown, which enters the beam splitter assembly in a non-optimal direction of incidence. In practice this means that the beam splitter assembly had, for example, been arranged so that it was rotated relative to incoming beam S. In FIG. 2a, incoming beam S' enters the beam splitter assembly at angle $\Delta\alpha$ relative to the optimal angle of incidence, and enters beam splitter element 1 also at angle $\Delta\alpha$, relative to incoming beam S. Despite the divergence, due to the design according to the present invention, the two outgoing beams SA1', SA2' on the exit side are exactly parallel to one another. This is the same result as is obtained in the optimal case, so that angle β' between the two outgoing beams SA1', SA2' is as follows: β'=β=0, where β is the angle between outgoing beams SA1, SA2 in the optimal case.

If a conventional Kösters prism was used, an angle β'≠0 would result, which would cause problems with the adjustment of downstream optical components.

FIG. 2b shows the effect on the two outgoing beams SA1', SA2' when incoming beam S' undergoes a parallel shift $\Delta d$ relative to the optimal direction of incidence of incoming beam S. In practice, this would mean that the beam splitter assembly had undergone a parallel shift relative to incoming beam S', e.g., due to non-optimal adjustment of the beam splitter assembly.

As can be seen from FIG. 2b, a parallel shift of this kind has no effect on the distance between the two outgoing beams SA1', SA2'. Even if incoming beam S' has undergone parallel shift $\Delta d$, the distance A' between the two outgoing beams SA1', SA2' is the same as the distance A between the two outgoing beams SA1, SA2 in the optimal case, so that A'=A.

By contrast, if a Kösters prism were used, one would expect a change in distance A', which would cause problems in the subsequent beam path.

A schematic view of the first embodiment of the interferometer according to the present invention in which the beam splitter assembly described above is used is shown in FIG. 3.

Interferometer 50 according to the present invention includes light source 51, such as an HeNe laser that is known, whose output beam enters beam splitter assembly 100 as incoming beam S. This assembly has the same design as the first exemplary embodiment described with the help of FIG. 1.

Two parallel outgoing beams SA1, SA2 exit beam splitter assembly 100. First outgoing beam SA1 travels into a reference arm of interferometer 50, in which stationary reference reflector 53 is arranged at a certain distance from beam splitter assembly 100. Reference reflector 53 is preferably a known triple prism.

The second outgoing beam travels into the measuring arm of interferometer 50, in which measuring reflector 54, whose relative position or absolute position is to be determined, is arranged movably in measuring direction x. Measuring reflector 54 is also preferably a triple prism.

After the two outgoing beams SA1, SA2 are reflected off the two reflectors 53, 54 in the measuring arm and the reference arm, the reflected beams SA1R, SA2R return to beam splitter assembly 100. The two beams SA1R, SA2R pass through the assembly in the reverse order, and come together and are combined at beam splitter surface 1.3. The pair of interference-capable beams finally reaches detector unit 55 as beam SIF. Detector unit 55 detects the resulting interference signals and forwards them to downstream evaluation unit 56 for further processing and for position determination. It is important to note that, for example, further optical elements may be arranged in the beam path of the two interference-capable beams. These optical elements may be, for example, optical polarization elements and beam splitting elements, which may, for example, be used to generate interference signals having a phase shift in a known manner.

Figure 4:
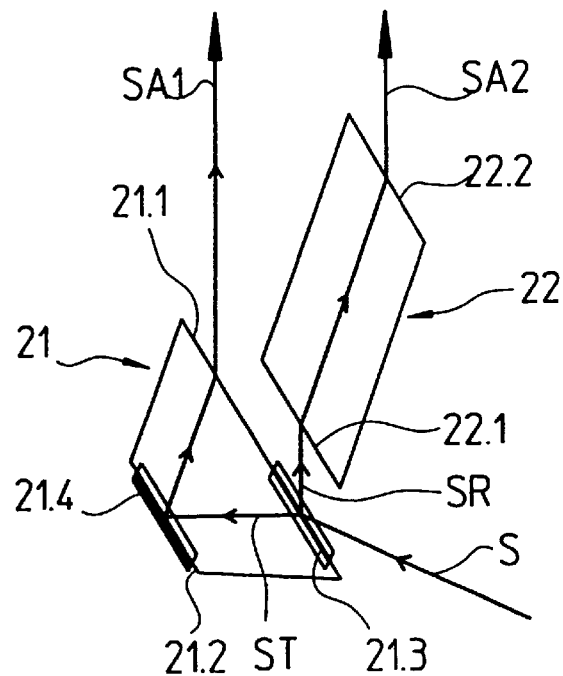
FIG. 4 is a diagram showing the beam path of a second embodiment of the beam splitter assembly according to the present invention.

A second exemplary embodiment of the beam splitter assembly according to the present invention is described with the help of FIG. 4. The beam splitter assembly includes two components: beam splitter element 21 and compensating element 22. Similarly to the previous exemplary embodiment, beam splitter element 21 and compensating element 22 can be plane-parallel plates and can be made of the materials mentioned previously.

Incoming beam S impinges on first boundary surface 21.1 of beam splitter element 21. In this area first boundary surface 21.1 is a beam splitter surface 21.3. At beam splitter surface 21.3, incoming beam S is split into first partial beam ST and second partial beam SR.

First partial beam ST passes through beam splitter surface 21.3 and, after passing through beam splitter element 21, impinges on a portion of second boundary surface 21.2. That portion can be a reflector surface 21.4. Partial beam ST is reflected back off reflector surface 21.4 in the direction of first boundary surface 21.1 and is transmitted in a partial area, so that refraction takes place at the transition from the glass to the air. First outgoing beam SA1 then exits beam splitter element 21.

Second partial beam SR, which is reflected off beam splitter surface 21.3, is deflected in the direction of compensating element 22, that is in the direction of first boundary surface 22.1. Partial beam SR passes through compensating element 22 and, at second boundary surface 22.2 thereof, exits as second outgoing beam SA2.

A third exemplary embodiment of the beam splitter assembly according to the present invention that combines the two preceding embodiments is explained below with the help of FIG. 5. In the embodiment shown in FIG. 1, the incoming beam impinges on the beam splitter surface from the glass side, whereas in the embodiment shown in FIG. 4 it impinges from the air side.

Figure 5:
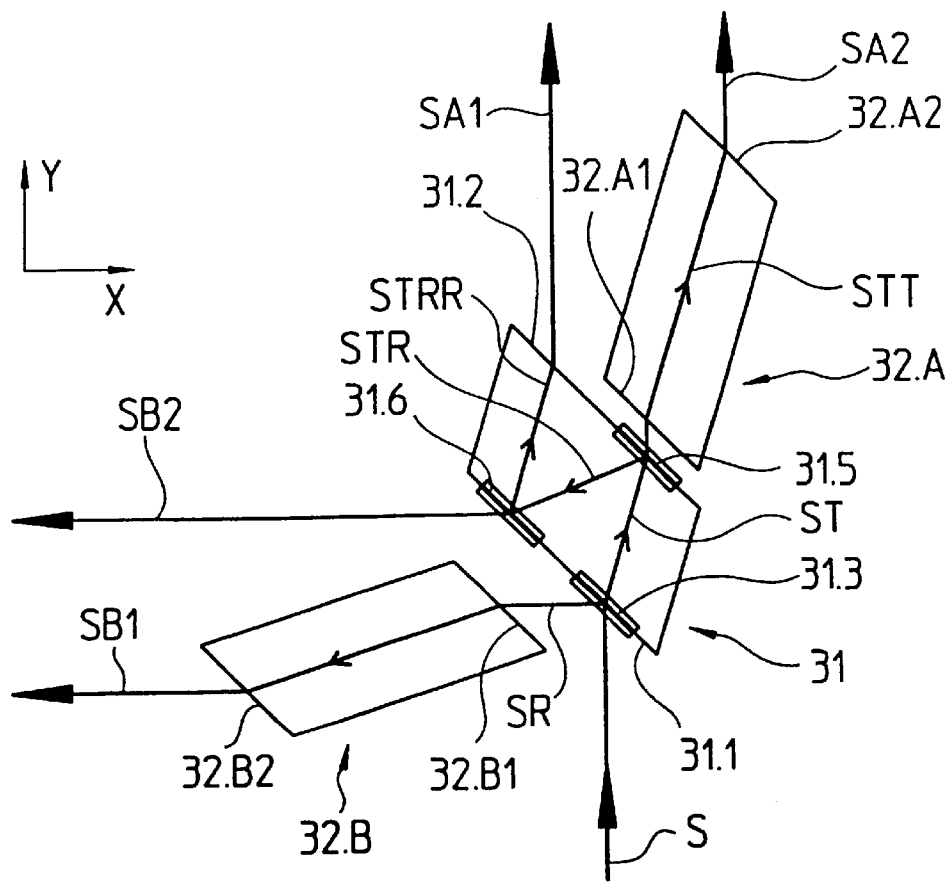
FIG. 5 is a diagram showing the beam path of a third embodiment of the beam splitter assembly according to the present invention.

The embodiment of the beam splitter assembly shown in FIG. 5 can be used, for example, in a two-axis interferometer, because two pairs of outgoing beams SA1, SA2 and SB1, SB2 emerge on the exit side. Each pair of outgoing beams SA1, SA2 and SB1, SB2 is used for measurements relative to one coordinate axis x or y. The beam splitter assembly according to the present invention can include beam splitter element 31 and two additional compensating elements 32A, 32B, one in each of the two exit directions x, y. As before, compensating elements 32A, 32B can be plane-parallel plates having at least two boundary surfaces that are parallel to one another.

Incoming beam S impinges on first boundary surface 31.1 of beam splitter element 31, which in this partial area has first beam splitter surface 31.3. Whereas in the embodiments described above the beam-splitting ratio at the beam splitter surfaces was generally 1:1, in the present case, a specific ratio of the intensity of the reflected partial beam to that of the transmitted partial beam is of greater significance. Thus first beam splitter surface 31.3 is designed so that intensity ratio I of reflected first partial beam SR to transmitted second partial beam ST is I=1:3.

At beam splitter surface 31.3, first partial beam SR is deflected in the direction of first compensating element 32.B, enters via its first boundary surface 32.B1, passes through it and exits first compensating element 32.B as first outgoing beam SB1 in the negative x direction.

Second partial beam ST passes through beam splitter element 31 in the direction of second boundary surface 31.2 of beam splitter element 31 and impinges in a partial area in which second beam splitter surface 31.5 is arranged. This partial area partially reflects and partially transmits impinging partial beam ST. The intensity ratio I of the reflected beam component to the transmitted beam component is, for example I=2:1. As a result, third and fourth partial beams STT, STR emerge at second beam splitter surface 31.5.

Fourth partial beam STR is reflected back in the direction of first boundary surface 31.1 of beam splitter element 31 and impinges on a partial area thereof which functions as beam splitter surface 31.6 and which will be referred to as third beam splitter surface 31.6. At third beam splitter surface 31.6, the ratio I of the reflected beam intensity to the transmitted beam intensity is, for example, I=1:1.

The partial beam transmitted at third beam splitter surface 31.6 exits beam splitter element 31 and thus exits the beam splitter assembly as second outgoing beam SB2, which is parallel to first outgoing beam SB1.

Third partial beam STT passes through second beam splitter surface 31.5 and propagates to second compensating element 32.A. After partial beam STT passes through first boundary surface 32.A1 of compensating element 32.A, it passes through compensating element 32.A and exits second compensating element 32.A through second boundary surface 32.A2, as third outgoing beam SA2, in the y-direction.

Partial beam STRR, which is reflected off the third beam splitter surface, is deflected in the direction of second boundary surface 31.2 of beam splitter element 31, and passes through this boundary surface 31.2 in a partial area in which refraction only occurs at the transition from glass to air. This partial beam STRR exits as fourth outgoing beam SA1, which is parallel to third outgoing beam SA2.

Figure 3:
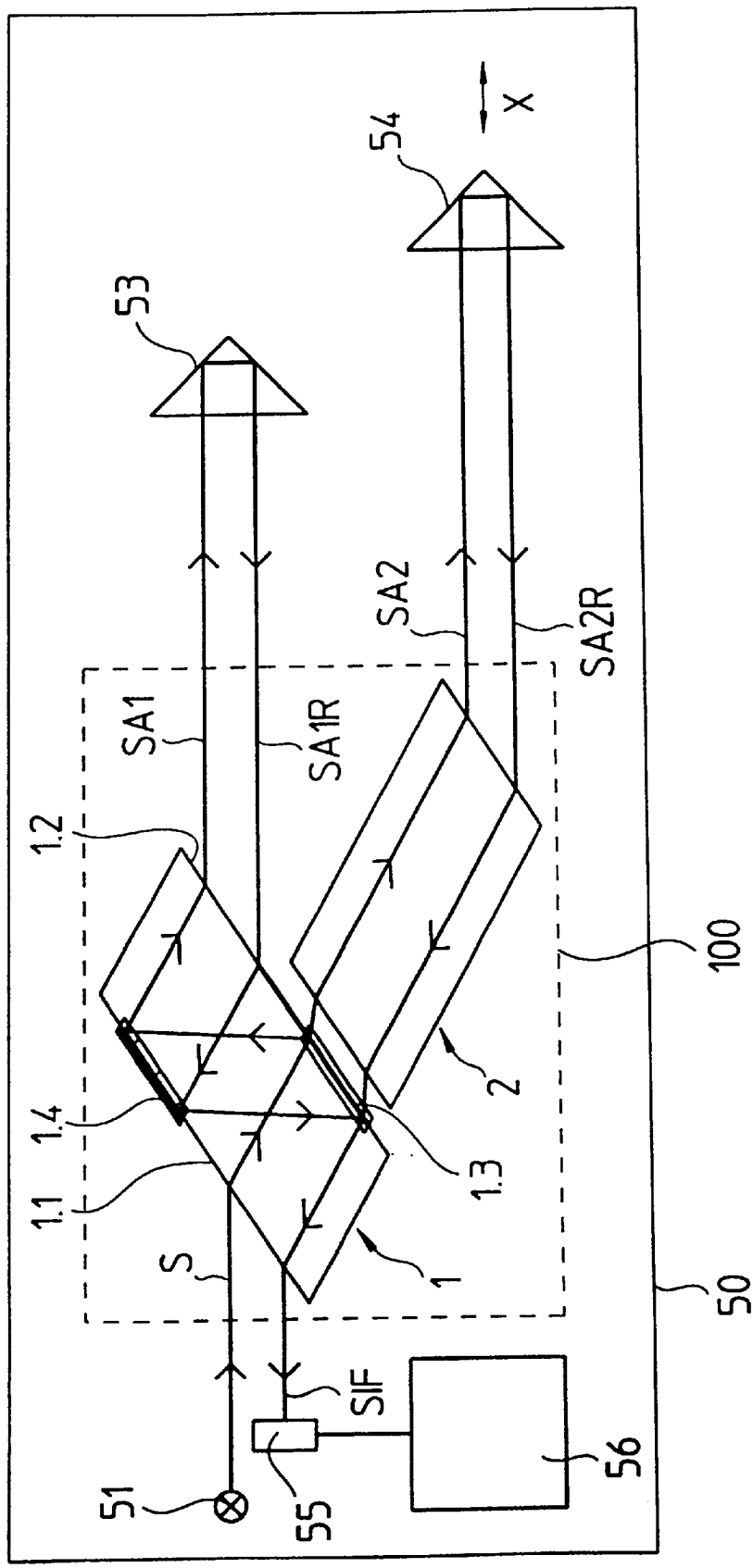
FIG. 3 is a diagram showing the beam path of a first embodiment of the interferometer according to the present invention, using the embodiment of the beam splitter assembly shown in FIG. 1.

The two pairs of parallel outgoing beams SA1, SA2 and SB1, SB2 are orthogonal to one another and can be used in appropriate interferometer arrangements to determine the position of a measuring reflector, for example in the arrangement explained with the help of FIG. 3.

Figure 6:
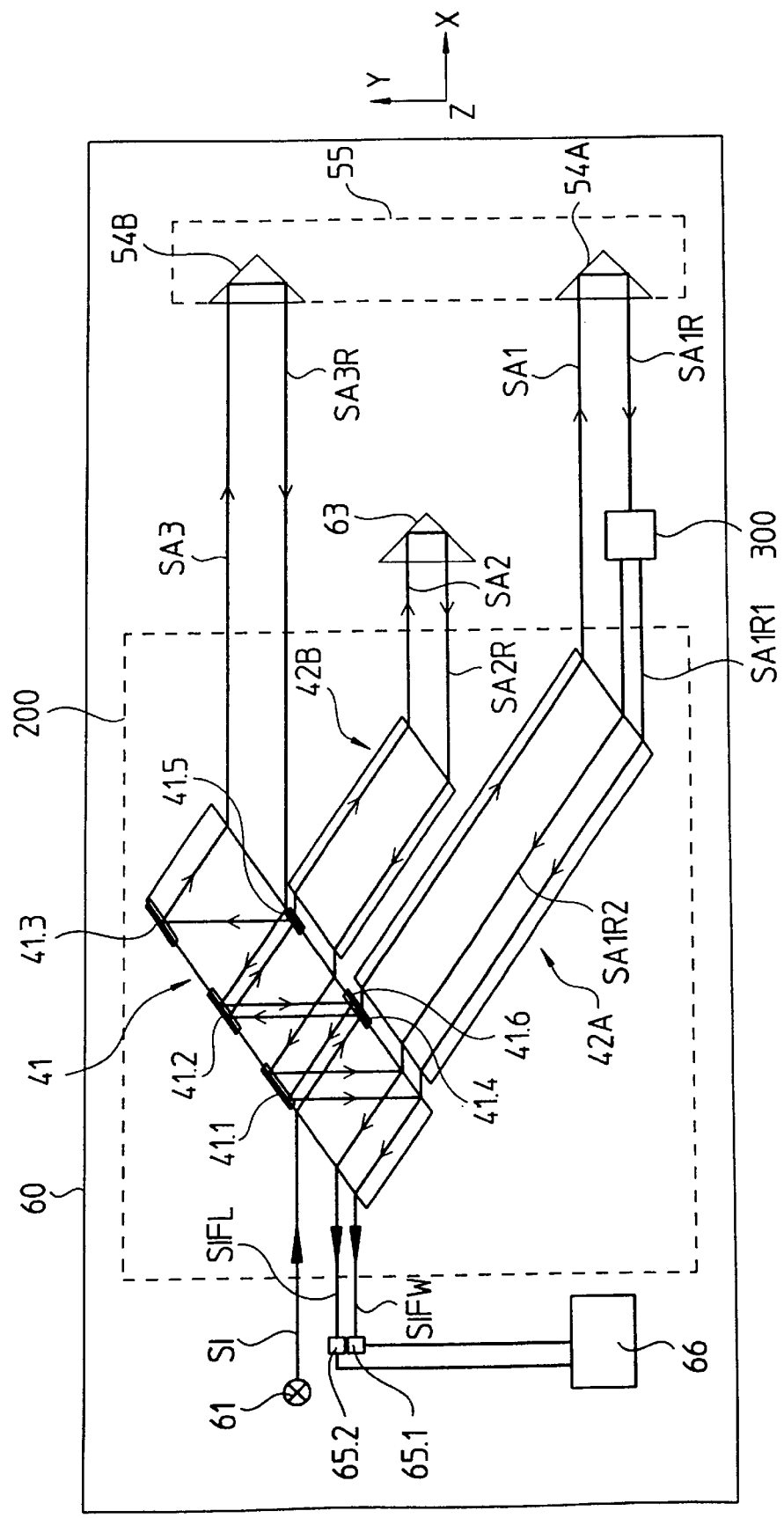
FIG. 6 is a diagram showing the beam path of a second embodiment of the interferometer according to the present invention.

A second embodiment of interferometer 60 according to the present invention is shown in FIG. 6. In the case of this embodiment, it is possible to detect the linear movement of an object to be measured and, at the same time, to measure any rotational movement of a linearly movable assembly. Possible applications include semiconductor manufacturing systems such as wafer steppers.

The embodiment shown in FIG. 6 includes two measuring reflectors 54A, 54B which are designed as triple prisms and are arranged together in a modular unit 55. Modular unit 55 can be moved in the x direction relative to the rest of the interferometer components. Furthermore, modular unit 55 can be rotated about axis z, which is perpendicular to the drawing plane. Movements in the x direction as well as rotation about the z axis can be detected with the help of the second interferometer embodiment according to the present invention.

To detect rotation about the z axis, certain modifications relative to the examples described above must be made to the beam path, including modifications to the design of the beam splitter assembly 200. These modifications are described below. Interferometer 60 according to the present invention includes light source 61, which supplies incoming beam S, which enters beam splitter assembly 200. As described in the example shown in FIG. 5, in addition to beam splitter element 41 two compensating elements 42A, 42B are provided, these being arranged a small distance away from beam splitter element 41, in the manner shown in FIG. 6.

Beam splitter element 41, first compensating element 42A and second compensating element 42B can be plane-parallel plates and can be made of the materials described above. A total of three partial areas, referred to as reflector surfaces 41.1, 41.2, 41.3 are arranged on the boundary surface of beam splitter element 41 that faces light source 61. Alternatively, a single continuous reflective layer may be used here. Two partial areas such as beam splitter surfaces 41.4, 41.5 are arranged on the opposite, second boundary surface. A further partial area such as reflector surface 41.6 is arranged between beam splitter surfaces 41.4, 41.5. Beam splitter surfaces 41.4, 41.5 are set up to obtain such as beam-splitting ratio so that the partial beams that are ultimately subject to interference have essentially the same intensity.

The embodiment of beam splitter assembly 200 shown in FIG. 6 delivers three parallel outgoing beams SA1, SA2, SA3 on the exit side. Two of the outgoing beams, SA1, SA3 are used as measuring beams which impinge on the two measuring reflectors 54A, 54B in modular unit 55. Third outgoing beam SA2, is used as a reference beam and impinges on stationary reference reflector 63, which is also a retro-reflective triple prism. After being reflected back off reflectors 54B and 63, the two beams SA2R and SA3R that have been reflected back reach beam splitter assembly 200 and return to second compensating element 42B and beam splitter element 41, respectively.

Beam SA1R that has been reflected back reaches additional beam splitter assembly 300, which is shown schematically in FIG. 6. Beam SA1R is split by second beam splitter assembly 300 into two parallel outgoing beams SA1R1, SA2R2, which then impinge on first compensating element 42A. Second beam splitter assembly 300 forms two parallel outgoing beams from one incident incoming beam. For example, a beam splitter assembly as described with the help of FIG. 1 may be used.

In beam splitter element 41, beam SA1R1 delivered by second beam splitter assembly 300 is combined with beam SA3R that has been reflected back off measuring reflector 54B. Acting as an interference-capable pair of beams, these two beams SA1R1, SA3R reach first detector unit 65.1 as beam SIFW. Herein, beam SIFW and the corresponding interference signal supply information regarding any rotation of modular unit 55 about the z axis.

In beam splitter element 41, beam SA1R2 delivered by second beam splitter assembly 300 is combined with beam SA2R that has been reflected back off stationary measuring reflector 63. These two beams SA1R2, SA2R are a second interference-capable pair of beams, and propagate to second detector unit 65.2 as beam SIFL. Beam SIFL supplies information regarding linear movement of modular unit 55 relative to the x measuring direction. The interference signals detected by detector units 65.1, 65.2 are forwarded to downstream evaluation unit 66 for further processing.

In this example, the optical path lengths traveled in the interferometer, for example in glass and in air, are identical. To accomplish this, the thickness of second compensating element 42B is twice as great as the thickness of beam splitter element 41. The thickness of first compensating element 42A is four times as great as the thickness of beam splitter element 41. The thicknesses of these elements is described with reference to the example shown in FIG. 1.

According to a further refinement of this exemplary embodiment, beams SA1R, SA2R, SA3R, which are reflected back off reflectors 54A, 54B, 63, may be reflected back in a different plane from that in which beams SA1, SA2, SA3 impinge on reflectors 54A, 54B, 63, Beams SA1R, SA2R, SA3R may therefore be reflected back to beam splitter assembly 200 perpendicular to the plane of incidence. This has certain advantages in terms of the size of beam splitter assembly 300 and the design of the various beam splitter surfaces and reflector surfaces in beam splitter assembly 300.

Figure 7:
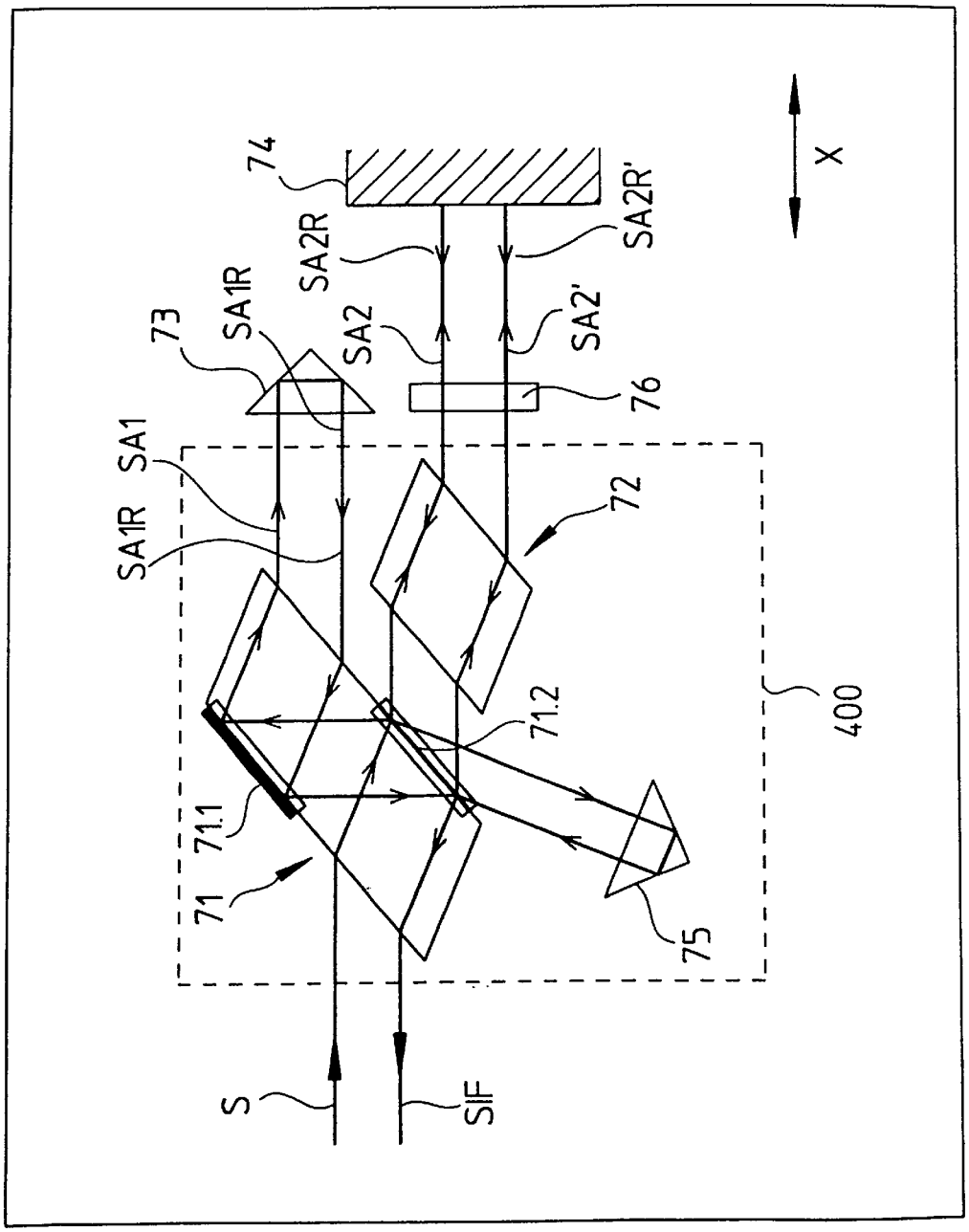
FIG. 7 is a diagram showing the beam path of a third embodiment of the interferometer according to the present invention.

A third embodiment of the interferometer according to the present invention is described with the help of FIG. 7. In the two types of interferometer embodiments described above, triple prisms were used as reflectors. By contrast, in this case, a planar mirror is used as a reflector in at least one interferometer arm, for example in the measuring arm. This is particularly useful if movements in a plane are to be detected with the help of the interferometer according to the present invention, for example when simultaneous movements in the x and y directions are detected. In such instances, to allow position determination using the interferometer, spatially elongated reflectors must be used so that retro-reflection from each measuring reflector can occur even if there is simultaneous movement in the x and y directions. Retro-reflective elements such as triple prisms are not suitable for this purpose.

In this example, linear polarized incoming beam S supplied by a light source (not shown in FIG. 7) first reaches beam splitter assembly 400, which in this embodiment includes additional reflector element 75 as well as beam splitter element 71 and compensating element 72. On the boundary surface of beam splitter element 71 that faces incident incoming beam S, a partial area used as reflective surface 71.1 is provided; a partial area used as beam splitter surface 71.2 is provided on the opposite boundary surface. Beam splitter assembly 400 delivers two parallel outgoing beams SA1, SA2.

In the reference arm of the interferometer, first outgoing beam SA1 propagates to reference reflector 73, which is designed as a retro-reflective triple prism. Beam SA1R is reflected back off reference reflector 73 in the direction of beam splitter assembly 400 and combined with second beam SA2R', so that a pair of interference-capable beams SIF propagate to the detector unit (not shown in FIG. 7).

Second outgoing beam SA2, which exits beam splitter assembly 400 in the direction of measuring reflector 74 which is movable in the x direction, produces second interference-capable beam SA2R', as described below. As indicated above, measuring reflector 74 can be a spatially elongated planar mirror.

Before impinging on measuring reflector 74, outgoing beam SA2, which is still linearly polarized, passes through polarization-modifying element 76 which can be a $\lambda/4$ plate, which renders beam SA2 circularly polarized. After being reflected back off measuring reflector 74, beam SA2R displays the opposite circular polarization. After passing through $\lambda/4$ plate 76 again, a linearly polarized beam is present, the polarization plane being perpendicular to that of original incoming beam S. After passing through compensating element 72, beam SA2R which is thus polarized impinges on beam splitter element 71.2 and is reflected in its entirety in the direction of retro-reflective reflector element 75. After being reflected back onto beam splitter surface 71.2 via reflector element 75, the beam is reflected again in its entirety in the direction of compensating element 72, before beam SA2' exits beam splitter assembly 400 in the direction of measuring reflector 74. After passing through $\lambda/4$ plate 76, a beam having circular polarization is present, which then impinges on measuring reflector 74.

After being reflected back off the measuring reflector, beam SA2R' again displays the opposite circular polarization. After passing through λ/4 plate 76, beam SA2R' is linearly polarized, the plane of polarization being perpendicular to the plane of polarization of beam SA1R, which is ultimately superimposed on it. To accomplish this, after passing through compensating element 72 and being transmitted through beam splitter surface 71.2, beam SA2R' is combined with beam SA1R within beam SIF, which finally propagates to the detector unit and supplies the movement-dependent interference signal.

In this embodiment of the interferometer according to the present invention, the requirement that the path lengths through in glass and air be the same can be met, even though beam splitter element 71 and compensating element 72 within the beam splitter assembly have the same thickness. The aforementioned requirement can be met in this configuration because the beams in question pass through compensating element 72 two or four times.

According to a further refinement, the interferometer embodiment shown in FIG. 7 can also be designed as a differential planar mirror interferometer. To accomplish this, a second planar mirror measuring reflector is required, in addition to measuring reflector 74 shown in the example in FIG. 7. One of the two outgoing beams SA2, SA2' then impinges on the second planar mirror.

Figure 8:
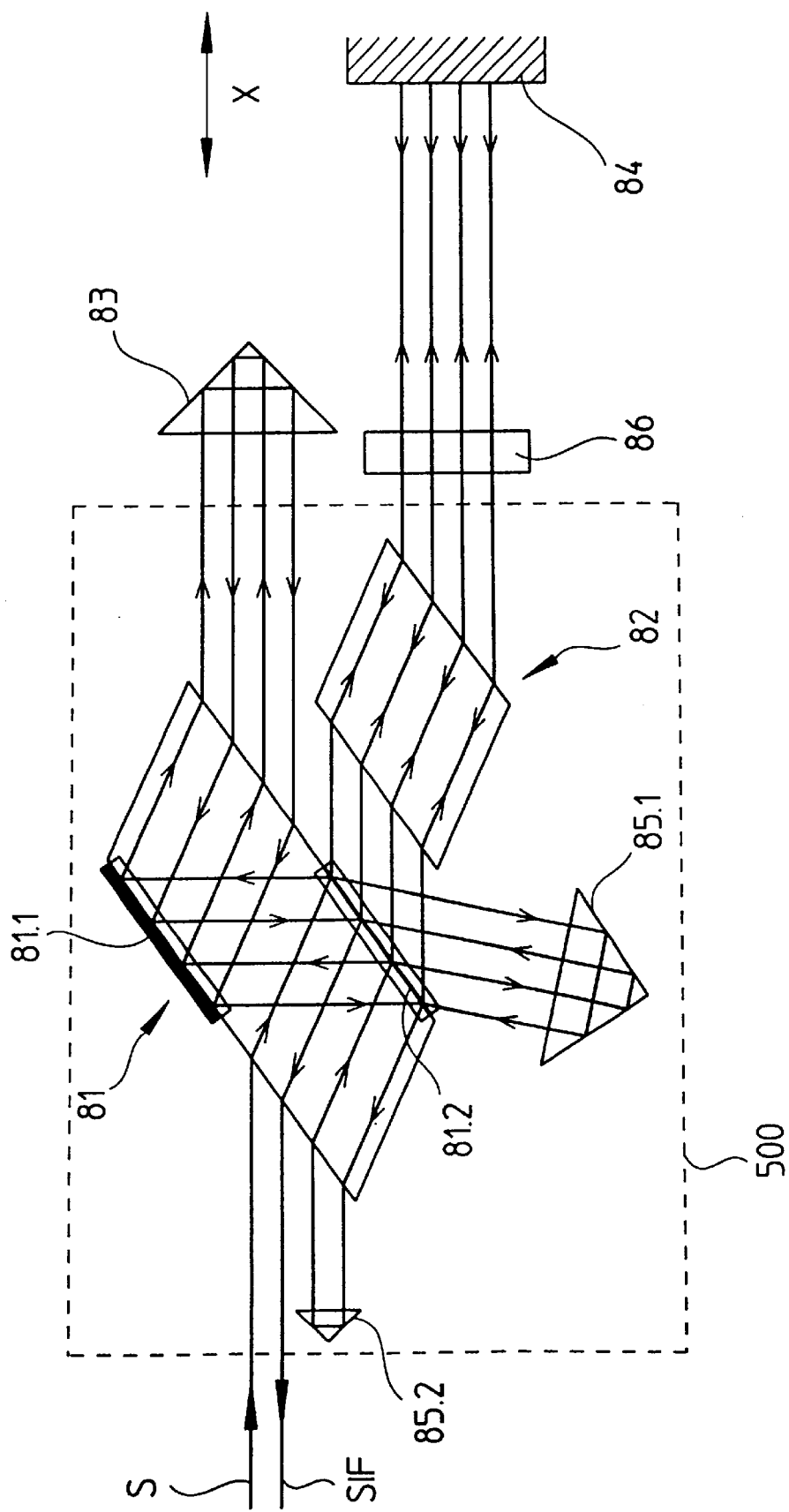
FIG. 8 is a diagram showing the beam path of a fourth embodiment of the interferometer according to the present invention.

FIG. 8 shows a further refinement for the interferometer 5 exemplary embodiment shown in FIG. 7. As before, movable measuring reflector 84 can be a planar mirror, while a triple prism is used as stationary reference reflector 83.

This fourth exemplary embodiment of the interferometer according to the present invention has a similar design as the third exemplary embodiment described above, but also includes a second reflector element 85.2 in beam splitter assembly 500. Beam splitter assembly 500 includes beam splitter element 81 having boundary surface partial areas, which function as reflector surfaces 81.1 and beam splitter surfaces 81.2. Polarization-modifying optical element 86 in the form of a λ/4 plate is arranged in the measuring arm.

Because of second reflector element 85.2, the beams in question make a second pass through all the interferometer components, after which a pair of interference-capable beams SIF reach a detector unit (not shown). Because the beams in question make a second pass through the various interferometer components, the signal period in the interference signal created is half of that in the previous example. Thus with this embodiment of the interferometer according to the present invention, increased resolution can be achieved in position determination.

The above embodiment can also be formed to include a differential planar mirror interferometer. In this case, a second planar mirror measuring reflector is required, on which two of the four outgoing beams SA2, SA2' then impinge.

The present invention is not meant to be limited to the exemplary embodiments described above. Additional embodiments can be made within the scope of the teaching and claims of the present invention.

What is claimed is:

1. A beam splitter assembly for an interferometer adapted to split an incoming beam into at least one first outgoing beam and at least one second outgoing beam parallel to the at least one first beam, comprising:

at least one beam splitter element, each of the at least one beam splitter elements further comprising a transparent plate having two parallel boundary surfaces, a first of the two boundary surfaces having a portion functioning as an at least partially reflective reflector surface, and a second of the two boundary surfaces having a portion functioning as a beam splitter surface;

at least one compensating element disposed relative to the at least one beam splitter element so that the at least one first and second outgoing beams propagate parallel to one another, the at least one compensating element having dimensions adapted to provide a substantially identical optical path length in the at least one beam splitter element as in the at least one compensating element to the at least one first and second outgoing beams.

2. The beam splitter assembly according to claim 1, wherein the beam splitter surface is adapted to split the incoming beam that impinges thereon into two partial beams that are polarized perpendicularly relative to one another.

3. The beam splitter assembly according to claim 1, wherein the beam splitter surface is adapted to split the incoming beam that impinges thereon into two partial beams having the same polarization.

4. The beam splitter assembly according to claim 1, wherein the reflector surface is a highly reflective dielectric layer packet.

5. The beam splitter assembly according to claim 1, wherein the at least one compensating element is disposed a certain distance from the at least one beam splitter element.

6. The beam splitter assembly according to claim 1, wherein the at least one compensating element is a plane-parallel plate passing through the two parallel boundary surfaces through which the incoming and the at least first and second outgoing beams enter and exit.

7. The beam splitter assembly according to claim 1, wherein the at least one beam splitter element and the at least one compensating element are disposed such that the incoming beam enters the at least one beam splitter element at a specified angle of incidence relative to a perpendicular to the first boundary surface, and thereafter impinges on the beam splitter surface which splits the incoming beam into a first partial beam reflected towards the first boundary surface, to the reflector surface which is adapted to further reflect said first partial beam towards a transparent portion of the second boundary surface forming a first exit of the beam splitter assembly for the at least one first outgoing beam, and into a second partial beam transmitted towards a first boundary surface of the at least one compensating element, said first boundary surface of the at least one compensating element being adapted to direct the second partial beam to a second boundary surface of the at least one compensating element forming a second exit of the beam splitter assembly for the at least one second outgoing beam.

8. The beam splitter assembly according to claim 7, wherein the angle of incidence is substantially equal to a Brewster angle.

9. The beam splitter assembly according to claim 7, wherein a thickness of the compensating element is about twice a thickness of the beam splitter element.

10. The beam splitter assembly according to claim 1, wherein the at least one beam splitter element and the at least one compensating element are disposed so that the incoming beam impinges thereon at a specified angle of incidence relative to a perpendicular of the second boundary surface, and wherein the beam splitter surface splits said incoming beam into a first partial beam transmitted through the beam splitter surface towards the first boundary surface of the beam splitter element, wherein the reflector surface reflects said first partial beam to a transparent portion of the second boundary surface of the beam splitter element forming a first exit of the beam splitter assembly for the at least one first outgoing beam, and into a second partial beam reflected by the beam splitter surface towards a first boundary surface of the compensating element, and passing there through towards a second exit of the beam splitter assembly for the at least one second outgoing beam.

11. The beam splitter assembly according to claim 1, further comprising a second and a third beam splitter surface of the beam splitter element, and first and second compensating elements, wherein the at least one beam splitter element and the first and second compensating elements are disposed so that the incoming beam impinges thereon at a specified angle of incidence relative to a perpendicular of the first boundary surface, and wherein the beam splitter surface splits said incoming beam into a first partial beam reflected by the beam splitter surface towards a first boundary surface of the first compensating element, the first partial beam thereafter exiting at a second boundary surface of the first compensating element forming a first exit of the beam splitter assembly for a first outgoing beam, into a second partial beam transmitted through the beam splitter surface towards the second beam splitter surface of the beam splitter element, wherein the second partial beam is further split into a third partial beam that is reflected back towards a partial area of the first boundary surface, wherein the third beam splitter surface further splits said third partial beam into a fifth partial beam passing through the third beam splitter surface to a second exit of the beam splitter assembly for a second outgoing beam, parallel to the first outgoing beam, and into a fourth partial beam transmitted through the second beam splitter surface towards a first boundary surface of the second compensating element, passing through the second compensating element towards a second boundary surface forming a third exit of the beam splitter assembly for a third outgoing beam, and a sixth partial beam reflected by the third beam splitter surface towards a transparent portion of the second boundary surface of the at least one beam splitter, forming a fourth exit of the beam splitter assembly for a fourth outgoing beam, which is parallel to the third outgoing beam.

12. The beam splitter assembly according to claim 11, wherein the first and second outgoing beams are perpendicular to the third and fourth outgoing beams.

13. The beam splitter assembly according to claim 1, further comprising first and second compensating elements, forming exits from the beam splitter assembly for first and second outgoing beams parallel to one another, and the at least one beam splitter element having a portion forming an exit from the at least one beam splitter element for a third outgoing beam which is also parallel to the first and second outgoing beams.

14. The beam splitter assembly according to claim 1, further comprising a retro-reflective reflector element arranged separately from the at least one beam splitter element and the at least one compensating element, said retro-reflective reflector element being adapted to reflect a beam that propagates from a beam splitter surface of the at least one beam splitter element back onto the beam splitter surface.

15. An interferometer having at least one measuring arm and a reference arm, comprising:

a light source;

at least one stationary reference reflector in the reference arm;

at least one measuring reflector movable in a measuring direction in the measuring arm;

a detector unit for detecting a position-dependent interference signal;

an evaluation unit for processing the interference signal detected by the detector unit, and at least one beam splitter assembly for splitting an incoming beam emitted by the light source into at least one first outgoing beam and at least one second outgoing beam parallel thereto, said at least one beam splitter assembly further comprising:

at least one beam splitter element comprising a transparent plate having two parallel boundary surfaces, one of these boundary surfaces having a portion functioning as a beam splitter surface, and a further boundary surface parallel to the aforementioned boundary surface having a portion functioning as an at least partially reflective reflector surface; and at least one compensating element arranged with respect to the at least one beam splitter element so that at least two outgoing beams propagate parallel to one another, and so that the at least two outgoing beams travel along optical paths having substantially the same length in the interferometer before reaching the detector unit.

16. The interferometer according to claim 15, further comprising an optical element arranged in a beam path of the at least one first and second outgoing beam, said optical element being dimensioned for use in predefined optical path lengths for outgoing beams exiting the beam splitter assembly.

17. The interferometer according to claim 16, wherein the optical element is a plane-parallel plate.

18. The interferometer according to claim 15, wherein the at least one beam splitter assembly further comprises:

first and second compensating elements, forming exits from the beam splitter assembly for first and second outgoing beams parallel to one another, and the at least one beam splitter element having a portion forming an exit from the at least one beam splitter element for a third outgoing beam parallel to the first and second outgoing beams, wherein the first and second outgoing beams impinge on two measuring reflectors disposed together in a modular unit movable linearly in a measuring direction, and rotatable about an axis perpendicular to the measuring direction.

19. The interferometer according to claim 15 wherein the at least partially reflective reflector surface are planar mirrors.

20. A beam splitter assembly for an interferometer adapted to split an incoming beam into at least one first outgoing beam and at least one second outgoing beam parallel to the at least one first beam, comprising:

at least one beam splitter element, each of the at least one beam splitter elements further comprising a transparent plate having two parallel boundary surfaces, a first of the two boundary surfaces having a portion that is a highly reflective dielectric layer packet functioning as a reflector surface, and a second of the two boundary surfaces having a portion functioning as a beam splitter surface;

at least one compensating element disposed relative to the at least one beam splitter element so that the at least one first and second outgoing beams propagate parallel to one another, the at least one compensating element having dimensions adapted to provide a substantially identical optical path length in the at least one beam splitter element as in the at least one compensating element to the at least one first and second outgoing beams.

21. A beam splitter assembly for an interferometer adapted to split an incoming beam into at least one first outgoing beam and at least one second outgoing beam parallel to the at least one first beam, comprising:

at least one beam splitter element, each of the at least one beam splitter elements further comprising a transparent plate having two parallel boundary surfaces, a first of the two boundary surfaces having a portion functioning as an at least partially reflective reflector surface, and a second of the two boundary surfaces having a portion functioning as a beam splitter surface;

at least one compensating element disposed relative to the at least one beam splitter element so that the at least one first and second outgoing beams propagate parallel to one another, the at least one compensating element having dimensions adapted to provide a substantially identical optical path length in the at least one beam splitter element as in the at least one compensating element to the at least one first and second outgoing beams, wherein the at least one compensating element is a plane-parallel plate passing through the two parallel boundary surfaces through which the incoming and the at least first and second outgoing beams enter and exit.

22. The beam splitter assembly according to claim 21, wherein the at least one beam splitter element and the at least one compensating element are disposed such that the incoming beam enters the at least one beam splitter element at a specified angle of incidence relative to a perpendicular to the first boundary surface, and thereafter impinges on the beam splitter surface which splits the incoming beam into a first partial beam reflected towards the first boundary surface, to the reflector surface which is adapted to further reflect said first partial beam towards a transparent portion of the second boundary surface forming a first exit of the beam splitter assembly for the at least one first outgoing beam, and into a second partial beam transmitted towards a first boundary surface of the at least one compensating element, said first boundary surface of the at least one compensating element being adapted to direct the second partial beam to a second boundary surface of the at least one compensating element forming a second exit of the beam splitter assembly for the at least one second outgoing beam.

23. The beam splitter assembly according to claim 21, wherein the at least one beam splitter element and the at least one compensating element are disposed so that the incoming beam impinges thereon at a specified angle of incidence relative to a perpendicular of the second boundary surface, and wherein the beam splitter surface splits said incoming beam into a first partial beam transmitted through the beam splitter surface towards the first boundary surface of the beam splitter element, wherein the reflector surface reflects said first partial beam to a transparent portion of the second boundary surface of the beam splitter element forming a first exit of the beam splitter assembly for the at least one first outgoing beam, and into a second partial beam reflected by the beam splitter surface towards a first boundary surface of the compensating element, and passing there through towards a second exit of the beam splitter assembly for the at least one second outgoing beam.

24. The beam splitter assembly according to claim 21, further comprising a second and a third beam splitter surface of the beam splitter element, and first and second compensating elements, wherein the at least one beam splitter element and the first and second compensating elements are disposed so that the incoming beam impinges thereon at a specified angle of incidence relative to a perpendicular of the first boundary surface, and wherein the beam splitter surface splits said incoming beam into a first partial beam reflected by the beam splitter surface towards a first boundary surface of the first compensating element, the first partial beam thereafter exiting at a second boundary surface of the first compensating element forming a first exit of the beam splitter assembly for a first outgoing beam, into a second partial beam transmitted through the beam splitter surface towards the second beam splitter surface of the beam splitter element wherein the second partial beam is further split into a third partial beam that is reflected back towards a partial area of the first boundary surface, wherein the third beam splitter surface further splits said third partial beam into a fifth partial beam passing through the third beam splitter surface to a second exit of the beam splitter assembly for a second outgoing beam, parallel to the first outgoing beam, and into a fourth partial beam transmitted through the second beam splitter surface towards a first boundary surface of the second compensating element, passing through the second compensating element towards a second boundary surface forming a third exit of the beam splitter assembly for a third outgoing beam, and a sixth partial beam reflected by the third beam splitter surface towards a transparent portion of the second boundary surface of the at least one beam splitter, forming a fourth exit of the beam splitter assembly for a fourth outgoing beam, which is parallel to the third outgoing beam.

25. The beam splitter assembly according to claim 21, further comprising first and second compensating elements, forming exits from the beam splitter assembly for first and second outgoing beams parallel to one another, and the at least one beam splitter element having a portion forming an exit from the at least one beam splitter element for a third outgoing beam which is also parallel to the first and second outgoing beams.

26. The beam splitter assembly according to claim 21, further comprising a retro-reflective reflector element arranged separately from the at least one beam splitter element and the at least one compensating element, said retro-reflective reflector element being adapted to reflect a beam that propagates from a beam splitter surface of the at least one beam splitter element back onto the beam splitter surface.

27. A beam splitter assembly for an interferometer adapted to split an incoming beam into at least one first outgoing beam and at least one second outgoing beam parallel to the at least one first beam, comprising:

at least one beam splitter element, each of the at least one beam splitter elements further comprising a transparent plate having two parallel boundary surfaces, a first of the two boundary surfaces having a portion functioning as an at least partially reflective reflector surface, and a second of the two boundary surfaces having a portion functioning as a beam splitter surface;

at least one compensating element disposed relative to the at least one beam splitter element so that the at least one first and second outgoing beams propagate parallel to one another, the at least one compensating element having dimensions adapted to provide a substantially identical optical path length in the at least one beam splitter element as in the at least one compensating element to the at least one first and second outgoing beams, wherein the at least one beam splitter element and the at least one compensating element are disposed such that the incoming beam enters the at least one beam splitter element at a angle of incidence substantially equal to a Brewster angle, the angle relative to a perpendicular to the first boundary surface, and thereafter impinges on the beam splitter surface which splits the incoming beam into a first partial beam reflected towards the first boundary surface, to the reflector surface which is adapted to further reflect said first partial beam towards a transparent portion of the second boundary surface forming a first exit of the beam splitter assembly for the at least one first outgoing beam, and into a second partial beam transmitted towards a first boundary surface of the at least one compensating element, said first boundary surface of the at least one compensating element being adapted to direct the second partial beam to a second boundary surface of the at least one compensating element forming a second exit of the beam splitter assembly for the at least one second outgoing beam.

28. The beam splitter assembly according to claim 27, wherein a thickness of the compensating element is about twice a thickness of the beam splitter element.

29. A beam splitter assembly for an interferometer adapted to split an incoming beam into at least one first outgoing beam and at least one second outgoing beam parallel to the at least one first beam, comprising:

at least one beam splitter element, each of the at least one beam splitter elements further comprising a transparent plate having two parallel boundary surfaces, a first of the two boundary surfaces having a portion functioning as an at least partially reflective reflector surface, and a second of the two boundary surfaces having a portion functioning as a beam splitter surface;

at least one compensating element disposed relative to the at least one beam splitter element so that the at least one first and second outgoing beams propagate parallel to one another, the at least one compensating element having dimensions adapted to provide a substantially identical optical path length in the at least one beam splitter element as in the at least one compensating element to the at least one first and second outgoing beams; and a second and a third beam splitter surface of the beam splitter element, and first and second compensating elements, wherein the at least one beam splitter element and the first and second compensating elements are disposed so that the incoming beam impinges thereon at a specified angle of incidence relative to a perpendicular of the first boundary surface, and wherein the beam splitter surface splits said incoming beam into a first partial beam reflected by the beam splitter surface towards a first boundary surface of the first compensating element, the first partial beam thereafter exiting at a second boundary surface of the first compensating element forming a first exit of the beam splitter assembly for a first outgoing beam, into a second partial beam transmitted through the beam splitter surface towards the second beam splitter surface of the beam splitter element, wherein the second partial beam is further split into a third partial beam that is reflected back towards a partial area of the first boundary surface, wherein the third beam splitter surface further splits said third partial beam into a fifth partial beam passing through the third beam splitter surface to a second exit of the beam splitter assembly for a second outgoing beam, parallel to the first outgoing beam, and into a fourth partial beam transmitted through the second beam splitter surface towards a first boundary surface of the second compensating element, passing through the second compensating element towards a second boundary surface forming a third exit of the beam splitter assembly for a third outgoing beam, and a sixth partial beam reflected by the third beam splitter surface towards a transparent portion of the second boundary surface of the at least one beam splitter, forming a fourth exit of the beam splitter assembly for a fourth outgoing beam, which is parallel to the third outgoing beam.

30. The beam splitter assembly according to claim 29, wherein the first and second outgoing beams are perpendicular to the third and fourth outgoing beams.

31. A beam splitter assembly for an interferometer adapted to split an incoming beam into at least one first outgoing beam and at least one second outgoing beam parallel to the at least one first beam, comprising:

at least one beam splitter element, each of the at least one beam splitter elements further comprising a transparent plate having two parallel boundary surfaces, a first of the two boundary surfaces having a portion functioning as an at least partially reflective reflector surface, and a second of the two boundary surfaces having a portion functioning as a beam splitter surface;

at least one compensating element disposed relative to the at least one beam splitter element so that the at least one first and second outgoing beams propagate parallel to one another, the at least one compensating element having dimensions adapted to provide a substantially identical optical path length in the at least one beam splitter element as in the at least one compensating element to the at least one first and second outgoing beams; and first and second compensating elements, forming exits from the beam splitter assembly for first and second outgoing beams parallel to one another, and the at least one beam splitter element having a portion forming an exit from the at least one beam splitter element for a third outgoing beam which is also parallel to the first and second outgoing beams.

* * * * *

UNITED STATES PATENT AND TRADEMARK OFFICE
CERTIFICATE OF CORRECTION

PATENT NO. : 6,369,951 B1
APPLICATION NO. : 09/511757
DATED : April 9, 2002
INVENTOR(S) : Erwin Spanner Page 1 of 1

It is certified that error appears in the above-identified patent and that said Letters Patent is hereby corrected as shown below:

Title page, Item (73) Assignee: should read:

--Dr. Johannes Heidenhain GmbH, Traunreut, Germany--.

Signed and Sealed this

Eighth Day of April, 2008

JON W. DUDAS
*Director of the United States Patent and Trademark Office*